(12) United States Patent
Lujan et al.

(10) Patent No.: US 10,688,991 B2
(45) Date of Patent: Jun. 23, 2020

(54) SYSTEMS AND METHODS FOR UNPROTECTED MANEUVER MITIGATION IN AUTONOMOUS VEHICLES

(71) Applicant: GM GLOBAL TECHNOLOGY OPERATIONS LLC, Detroit, MI (US)

(72) Inventors: Eric Lujan, San Francisco, CA (US); Benjamin Weinstein-Raun, San Francisco, CA (US); Drew Gross, San Francisco, CA (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 204 days.

(21) Appl. No.: 15/878,620

(22) Filed: Jan. 24, 2018

(65) Prior Publication Data

US 2018/0148051 A1    May 31, 2018

(51) Int. Cl.
| | |
|---|---|
| *B60W 30/095* | (2012.01) |
| *G05D 1/02* | (2020.01) |
| *B60W 40/04* | (2006.01) |
| *G08G 1/00* | (2006.01) |
| *G01C 21/32* | (2006.01) |
| *B60W 30/18* | (2012.01) |
| *G01C 21/34* | (2006.01) |
| *G08G 1/16* | (2006.01) |

(52) U.S. Cl.
CPC .. *B60W 30/0956* (2013.01); *B60W 30/18154* (2013.01); *B60W 30/18163* (2013.01); *B60W 40/04* (2013.01); *G01C 21/32* (2013.01); *G05D 1/0214* (2013.01); *G05D 1/0217* (2013.01); *G08G 1/202* (2013.01); *B60W 2554/00* (2020.02); *G01C 21/3461* (2013.01); *G05D 2201/0213* (2013.01); *G08G 1/166* (2013.01)

(58) Field of Classification Search
CPC ......... B60W 30/0956; B60W 2550/20; B60W 30/18154; B60W 30/18163; B60W 40/04; G05D 1/0217; G05D 1/0214; G05D 2201/0213; G01C 21/32; G01C 21/3461; G08G 1/166; G08G 1/202
USPC .......................................................... 701/26
See application file for complete search history.

(56) References Cited

U.S. PATENT DOCUMENTS

| | | | |
|---|---|---|---|
| 6,477,515 B1 | 11/2002 | Boroujerdi | |
| 9,645,577 B1 | 5/2017 | Frazzoli | |
| 2007/0219711 A1 | 9/2007 | Kaldewey | |
| 2016/0299507 A1* | 10/2016 | Shah | G05D 1/0206 |
| 2017/0168485 A1* | 6/2017 | Berntorp | B60W 30/00 |

(Continued)

*Primary Examiner* — Jonathan M Dager
*Assistant Examiner* — Jean W Charleston
(74) *Attorney, Agent, or Firm* — Lorenz & Kopf LLP

(57) ABSTRACT

Systems and method are provided for controlling a vehicle. In various embodiments, a method of path planning for a vehicle includes receiving sensor data relating to an environment associated with the vehicle; defining a region of interest for the vehicle, based on the sensor data; defining a graph comprising a plurality of nodes, each of the plurality of nodes comprising a state of the vehicle and an associated cost, based on a cost function as applied to the state of the vehicle, at one of a plurality of points in time; and performing, via a processor, a search of the graph, based on the associated costs of each node of the graph, to determine a selected path for the vehicle through the region of interest that minimizes a total cost via the graph.

20 Claims, 8 Drawing Sheets

(56) References Cited

U.S. PATENT DOCUMENTS

| | | | |
|---|---|---|---|
| 2018/0356819 A1* | 12/2018 | Mahabadi | G05D 1/0088 |
| 2019/0080266 A1* | 3/2019 | Zhu | G08G 1/165 |
| 2019/0176829 A1 | 6/2019 | Luders | |

* cited by examiner

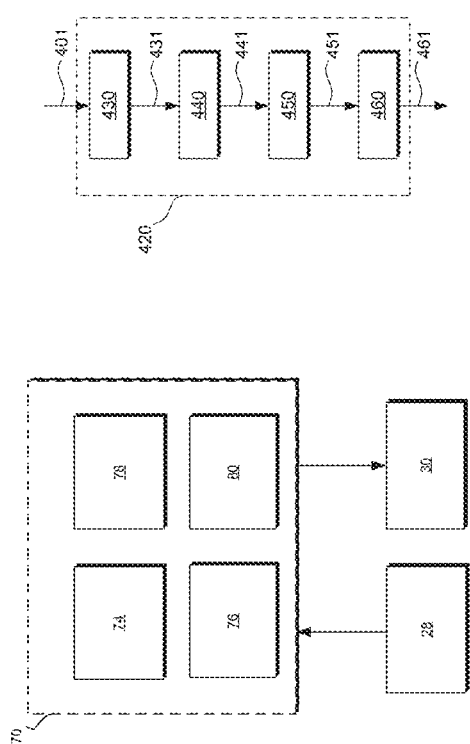

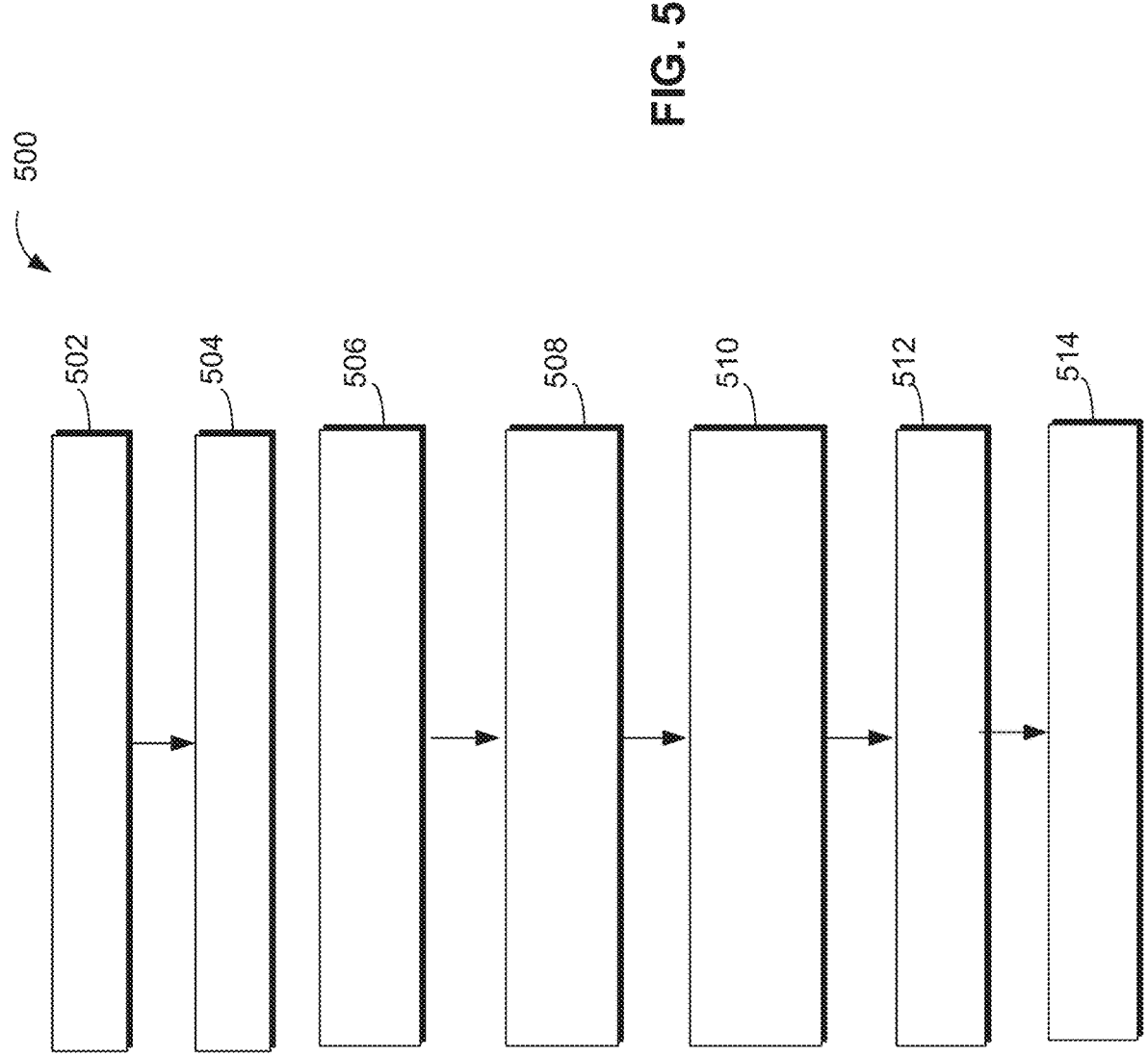

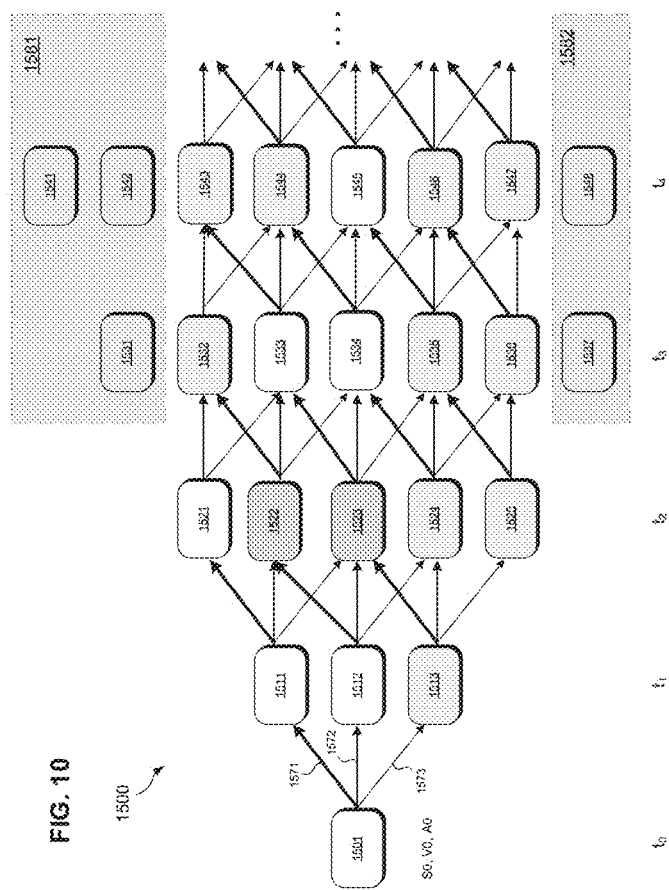

SYSTEMS AND METHODS FOR UNPROTECTED MANEUVER MITIGATION IN AUTONOMOUS VEHICLES

TECHNICAL FIELD

The present disclosure generally relates to autonomous vehicles, and more particularly relates to systems and methods for path planning in an autonomous vehicle.

BACKGROUND

An autonomous vehicle is a vehicle that is capable of sensing its environment and navigating with little or no user input. It does so by using sensing devices such as radar, lidar, image sensors, and the like. Autonomous vehicles further use information from global positioning systems (GPS) technology, navigation systems, vehicle-to-vehicle communication, vehicle-to-infrastructure technology, and/or drive-by-wire systems to navigate the vehicle.

While recent years have seen significant advancements in autonomous vehicles, such vehicles might still be improved in a number of respects. For example, it is often difficult for an autonomous vehicle to quickly determine a suitable path (along with target accelerations and velocities) to maneuver through a region of interest while avoiding obstacles whose paths might intersect with the region of interest within some predetermined planning horizon. Such scenarios arise, for example, while taking an unprotected left turn, maneuvering around a double-parked car, merging into oncoming traffic, and the like.

Accordingly, it is desirable to provide systems and methods for path planning in autonomous vehicles. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for path planning for a vehicle. In one example, a method of path planning for a vehicle includes: receiving sensor data relating to an environment associated with the vehicle; defining a region of interest for the vehicle, based on the sensor data; defining a graph including a plurality of nodes, each of the plurality of nodes including a state of the vehicle and an associated cost, based on a cost function as applied to the state of the vehicle, at one of a plurality of points in time; and performing, via a processor, a search of the graph, based on the associated costs of each node of the graph, to determine a selected path for the vehicle through the region of interest that minimizes a total cost via the graph.

Also in one example, the method includes determining a set of predicted object paths of one or more objects likely to intersect the region of interest; wherein the step of defining the graph includes defining the graph using the set of predicted object paths of the one or more objects likely to intersect the region of interest; and wherein the cost function is based on at least one of occupant comfort, energy usage, and a distance between the vehicle and the one or more objects.

Also in one example, the step of defining the graph includes defining the graph using an acceleration of the vehicle at different future points in time, utilizing a time step, such that different nodes are connected based on an acceleration of the vehicle at the different points of time following various iterations of the time step.

Also in one example, the step of defining the graph includes defining the graph to include, for each node, a corresponding state including the acceleration of the vehicle in addition to a position and velocity of the vehicle at a particular one of the future points in time, along with a cost associated with the particular state.

Also in one example, the method includes ignoring or deleting, from the graph, any nodes for which the velocity of the vehicle is less than a predetermined minimum threshold speed or is greater than a predetermined maximum threshold speed.

Also in one example, the step of defining the graph includes defining the graph to include, for each node, the corresponding state including a proximity to one or more objects in the region of interest, in addition to the position, velocity, and acceleration of the vehicle at the particular one of the future points in time, along with the cost associated with the particular state.

Also in one example, the vehicle is an autonomous vehicle, and the method further includes automatically implementing the selected path, via instructions provided by the processor, for the autonomous vehicle to travel through the region of interest.

In another example, a system for path planning for a vehicle includes a region of interest determination modules and a graph definition and analysis module. The region of interest determination module is configured to at least facilitate receiving sensor data relating to an environment associated with a vehicle, and defining a region of interest for the vehicle, based on the sensor data. The graph definition and analysis module is coupled to the region of interest determination module, and configured to at least facilitate defining a graph including a plurality of nodes, each of the plurality of nodes including a state of the vehicle and an associated cost, based on a cost function as applied to the state of the vehicle, at one of a plurality of points in time, and performing, via a processor, a search of the graph, based on the associated costs of each node of the graph, to determine a selected path for the vehicle through the region of interest that minimizes a total cost via the graph.

Also in one example, the system further includes an object path determination module configured to at least facilitate determining a set of predicted object paths of one or more objects likely to intersect the region of interest; wherein the graph definition and analysis module is configured to at least facilitate defining the graph using the set of predicted object paths of the one or more objects likely to intersect the region of interest.

Also in one example, the graph definition and analysis module is configured to at least facilitate defining the graph using an acceleration of the vehicle at different future points in time, utilizing a time step, such that different nodes are connected based on an acceleration of the vehicle at the different points of time following various iterations of the time step.

Also in one example, the graph definition and analysis module is configured to at least facilitate defining the graph to include, for each node, a corresponding state including the acceleration of the vehicle in addition to a position and velocity of the vehicle at a particular one of the future points in time, along with a cost associated with the particular state.

Also in one example, the graph definition and analysis module is configured to at least facilitate ignoring or deleting, from the graph, any nodes for which the velocity of the vehicle is less than a predetermined minimum threshold speed or is greater than a predetermined maximum threshold speed.

Also in one example, the graph definition and analysis module is configured to at least facilitate defining the graph to include, for each node, the corresponding state including a proximity to one or more objects in the region of interest, in addition to the position, velocity, and acceleration of the vehicle at the particular one of the future points in time, along with the cost associated with the particular state.

Also in one example, the vehicle is an autonomous vehicle, and the graph definition and analysis module is configured to at least facilitate automatically implementing the selected path, via instructions provided by the processor, for the autonomous vehicle to travel through the region of interest.

In another example, an autonomous vehicle includes at least one sensor and a controller. The at least one sensor provides sensor data. The controller, by a processor, is configured to, based on the sensor data: define a region of interest for the vehicle; define a graph including a plurality of nodes, each of the plurality of nodes including a state of the vehicle and an associated cost, based on a cost function as applied to the state of the vehicle, at one of a plurality of points in time; perform a search of the graph, based on the associated costs of each node of the graph, to determine a selected path for the vehicle through the region of interest that minimizes a total cost via the graph; and automatically implement the selected path for the autonomous vehicle to travel through the region of interest.

Also in one example, the controller is configured to determine a set of predicted object paths of one or more objects likely to intersect the region of interest; and define the graph using the set of predicted object paths of the one or more objects likely to intersect the region of interest.

Also in one example, the controller is configured to define the graph using an acceleration of the vehicle at different future points in time, utilizing a time step, such that different nodes are connected based on an acceleration of the vehicle at the different points of time following various iterations of the time step.

Also in one example, the controller is configured to define the graph to include, for each node, a corresponding state including the acceleration of the vehicle in addition to a position and velocity of the vehicle at a particular one of the future points in time, along with a cost associated with the particular state.

Also in one example, the controller is configured to ignore or delete, from the graph, any nodes for which the velocity of the vehicle is less than a predetermined minimum threshold speed or is greater than a predetermined maximum threshold speed.

Also in one example, the controller is configured to define the graph to include, for each node, the corresponding state including a proximity to one or more objects in the region of interest, in addition to the position, velocity, and acceleration of the vehicle at the particular one of the future points in time, along with the cost associated with the particular state.

DESCRIPTION OF THE DRAWINGS

The exemplary embodiments will hereinafter be described in conjunction with the following drawing figures, wherein like numerals denote like elements, and wherein:

FIG. 3 is functional block diagram illustrating an autonomous driving system (ADS) associated with an autonomous vehicle, in accordance with various embodiments;

FIG. 4 is a dataflow diagram illustrating a path planning system of an autonomous vehicle, in accordance with various embodiments;

FIG. 5 is a flowchart illustrating a lattice based control method for controlling the autonomous vehicle when facing a maneuver, in accordance with various embodiments;

FIG. 10 illustrates an example lattice to be used in connection with a lattice-based control method, such as the lattice based control method of FIG. 5, in accordance with various embodiments.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
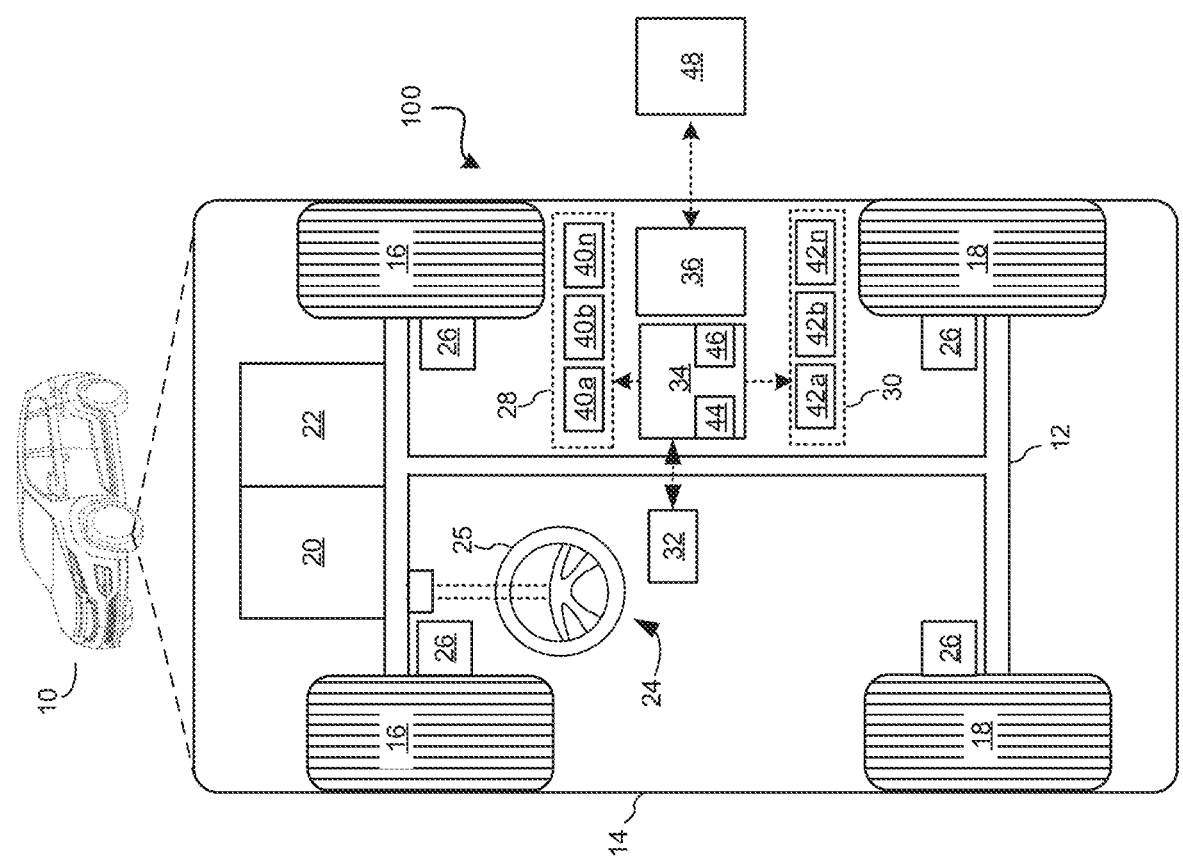
FIG. 1 is a functional block diagram illustrating an autonomous vehicle including a path planning system, in accordance with various embodiments.

With reference to FIG. 1, a path planning system shown generally as 100 is associated with a vehicle (or "AV") 10 in accordance with various embodiments. In general, path planning system (or simply "system") 100 allows for selecting a path for AV 10 by combining the outputs of multiple path planning systems. In various embodiments, the path planning system 100 employs a lattice-based graph that is based on, for example, discretized values of acceleration, or other values.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the path planning system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, etc., can also be used.

In an exemplary embodiment, the autonomous vehicle 10 corresponds to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, that the embodiments in accordance with the present subject matter are not limited to any particular taxonomy or rubric of automation categories. Furthermore, systems in accordance with the present embodiment may be used in conjunction with any vehicle in which the present subject matter may be implemented, regardless of its level of autonomy.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10 (such as the state of one or more occupants). Sensing devices 40a-40n might include, but are not limited to, radars (e.g., long-range, medium-range-short range), lidars, global positioning systems, optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter.

The actuator system 30 includes one or more actuator devices 42a-42n that control one or more vehicle features such as, but not limited to, the propulsion system 20, the transmission system 22, the steering system 24, and the brake system 26. In various embodiments, autonomous vehicle 10 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. Route information may also be stored within data storage device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10. In various embodiments, controller 34 is configured to implement a path planning system as discussed in detail below.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals that are transmitted to the actuator system 30 to automatically control the components of the autonomous vehicle 10 based on the logic, calculations, methods, and/or algorithms. Although only one controller 34 is shown in FIG. 1, embodiments of the autonomous vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

Figure 2:
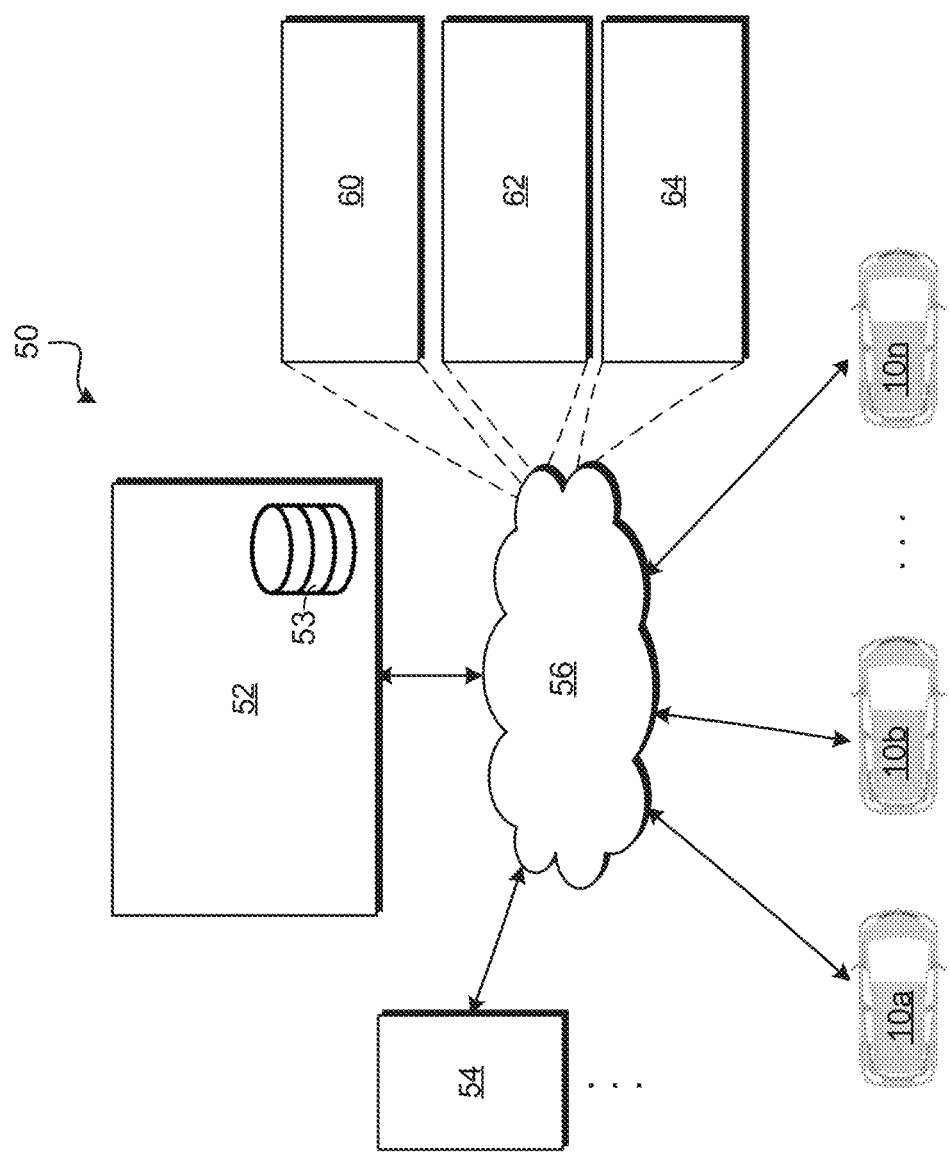
FIG. 2 is a functional block diagram illustrating a transportation system having one or more autonomous vehicles as shown in FIG. 1, in accordance with various embodiments.

The communication system 36 is configured to wirelessly communicate information to and from other entities 48, such as but not limited to, other vehicles ("V2V" communication), infrastructure ("V2I" communication), networks ("V2N" communication), pedestrian ("V2P" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous-vehicle-based remote transportation system. FIG. 2 illustrates an exemplary embodiment of an operating environment shown generally at 50 that includes an autonomous-vehicle-based remote transportation system (or simply "remote transportation system") 52 that is associated with one or more autonomous vehicles 10a-10n as described with regard to FIG. 1. In various embodiments, the operating environment 50 (all or a part of which may correspond to entities 48 shown in FIG. 1) further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 may include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a component of a home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, not shown), which may be cloud-based, network-based, or resident at the particular campus or geographical location serviced by the remote transportation system 52. The remote transportation system 52 can be manned by a live advisor, an automated advisor, an artificial intelligence system, or a combination thereof. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, biometric data, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

In accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10.

In various embodiments, the instructions of the autonomous driving system 70 may be organized by function or system. For example, as shown in FIG. 3, the autonomous driving system 70 can include a perception system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the perception system 74 includes a computer vision system (and, in various embodiments, one or more lidar, radar, and/or other systems), and synthesizes and processes sensor data and predicts the presence, location, classification, and/or path of objects and features of the environment of the vehicle 10. In various embodiments, the computer vision system 74 can incorporate information from multiple sensors (e.g., sensor system 28), including but not limited to cameras, lidars, radars, and/or any number of other types of sensors.

The positioning system 76 processes sensor data along with other data to determine a position (e.g., a local position relative to a map, an exact position relative to a lane of a road, a vehicle heading, etc.) of the vehicle 10 relative to the environment. As can be appreciated, a variety of techniques may be employed to accomplish this localization, including, for example, simultaneous localization and mapping (SLAM), particle filters, Kalman filters, Bayesian filters, and the like.

The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

It will be understood that various embodiments of the path planning system 100 according to the present disclosure may include any number of sub-modules embedded within the controller 34 which may be combined and/or further partitioned to similarly implement systems and methods described herein. Furthermore, inputs to the path planning system 100 may be received from the sensor system 28, received from other control modules (not shown) associated with the autonomous vehicle 10, received from the communication system 36, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like.

In various embodiments, all or parts of the path planning system 100 may be included within the computer vision system 74, the positioning system 76, the guidance system 78, and/or the vehicle control system 80. As mentioned briefly above, the path planning system 100 of FIG. 1 is configured to select a path for AV 10 by choosing between the outputs of multiple path planning modules.

Referring to FIG. 4, an exemplary path planning system generally includes a lattice based solver module (or simply "solver module") 420 that takes as its input sensor data 401 (e.g., optical camera data, lidar data, radar data, and the like) and produces an output 461 specifying a selected path. The selected path is defined through a region of interest that avoids moving objects (e.g., other vehicles) whose paths might intersect the region of interest during some predetermined time interval, e.g., a "planning horizon."

As used throughout this Application, in various embodiments a "path" refers to a possible path, candidate path, or seeding for a possible path for which the AV 10 may travel. In certain embodiments, a "path" includes a seeding and/or a rough and/or preliminary possible path for travel of the AV 10 based at least in part on potential objects nearby the AV 10 and/or the path, for further refinement by a path planning system of the AV 10 prior to implementation for movement of the AV 10. Accordingly, in various embodiments, the "path" as referred to herein may not be directly realized by the controls system. Instead, in various embodiments, the "path" is used to identify which obstacles should be considered "front" or "rear" obstacles (that is, which obstacles the AV 10 should travel in front of or behind), for example by filtering predicted obstacles and making yielding decisions for refinement and implementation as part of a larger computer control system. In various embodiments, this determination is used by a granular longitudinal planning system (e.g., in certain embodiments, based on a model-predictive control algorithm using quadratic programming, which may be part of one or more other systems of the AV 10). In various embodiments, this occurs because the output of the lattice solver may not be very precise; it is used to simplify the problem so that other components may more easily choose and realize an optimal path.

In accordance with various embodiments, the solver module 420 includes a region of interest determination module 430, an object path determination module 440, an AV state determination module 450, and a graph definition and analysis module 460.

Module 430 is generally configured to define or assist in defining a region of interest and an intended path of the vehicle based on the sensor data 401 (generating preliminary output 431). Module 440 is generally configured to determine a set of predicted paths of one or more objects likely to intersect the region of interest within a planning horizon (e.g., a predetermined length of time) (generating preliminary output 441). Module 450 is generally configured to determine a state of the AV 10 (e.g., including position, velocity, and acceleration of the AV 10) with respect to the region of interest (generating preliminary output 451). Module 460 is generally configured to construct a directed graph based on a lattice of future states (e.g., position, velocity, and acceleration) along with a cost function to determine a selected path 461 that substantially minimizes the cost function (generating the above-referenced output 461 for the lattice based solver module 420).

In various embodiments, output 461 of the lattice based solver module 420 may take a variety of forms, but will generally specify, as a function of time, a path in terms of positions, velocities, and accelerations of the type that might typically be produced by guidance system 78 of FIG. 3. That is, the term "path" as used in connection with the actions of AV 10, will generally include, in addition to positional information as a function of time, a series of planned accelerations, braking events, and the like that will accomplish the intended maneuver. The lattice based solver module 420 may also be referred to herein by the shorthand phrase "lattice solver module."

One or more of the modules described above (e.g., modules 420, 430, 440, 450, and 460) may be implemented as one or more machine learning models that undergo supervised, unsupervised, semi-supervised, or reinforcement learning and perform classification (e.g., binary or multiclass classification), regression, clustering, dimensionality reduction, and/or such tasks. Examples of such models include, without limitation, artificial neural networks (ANN) (such as a recurrent neural networks (RNN) and convolutional neural network (CNN)), decision tree models (such as classification and regression trees (CART)), ensemble learning models (such as boosting, bootstrapped aggregation, gradient boosting machines, and random forests), Bayesian network models (e.g., naive Bayes), principal component analysis (PCA), support vector machines (SVM), clustering models (such as K-nearest-neighbor, K-means, expectation maximization, hierarchical clustering, and so on), linear discriminant analysis models. In some embodiments, training of any models incorporated into module 420 may take place within a system remote from vehicle 10 (e.g., system 52 in FIG. 2) and subsequently downloaded to vehicle 10 for use during normal operation of vehicle 10. In other embodiments, training occurs at least in part within controller 34 of vehicle 10, itself, and the model is subsequently shared with external systems and/or other vehicles in a fleet (such as depicted in FIG. 2). In addition, in certain embodiments, one or more of the modules may implement a lattice solver that utilizes a heuristic approach to path planning and constraint processing.

Referring now to FIG. 5, and with continued reference to FIGS. 1-4, the illustrated flowchart provides a control method 500 for planning a path for a vehicle (e.g., and autonomous vehicle) through a region of interest using a lattice based solver, and that can be performed by path planning system 100 (e.g., module 420) in accordance with the present disclosure. As can be appreciated in light of the disclosure, the order of operation within the method is not limited to the sequential execution as illustrated in the figure, but may be performed in one or more varying orders as applicable and in accordance with the present disclosure. In various embodiments, the method can be scheduled to run based on one or more predetermined events, and/or can run continuously during operation of autonomous vehicle 10.

In various embodiments, the method begins at 502, in which a "region of interest" and intended path of AV 10 are determined. In general, the phrase "region of interest" refers to any closed spatial region (e.g., roadway, intersection, or the like) through which AV 10 intends to traverse in the near term (e.g., within some predetermined time interval or "planning horizon"). This region may be determined, for example, by guidance system 78 of FIG. 3 in conjunction with module 430 of FIG. 4, and may be specified in a variety of different manners. For example, the region of interest may be defined as a polygon, a curvilinear closed curve, or any other closed shape. In some embodiments, the "width" of the region of interest (i.e., in a direction perpendicular to the intended movement of AV 10 within the region of interest) is equal to the width of AV 10 plus some predetermined margin or buffer distance (e.g., buffer 11 in FIG. 7). In one embodiment, the region of interest pertains to the AV's execution of a left turn or a right turn through an intersection; however, this may vary in other embodiments. It will be understood that the nature of the region of interest and intended path will vary depending upon the context and the maneuver planned for AV 10 (e.g., unprotected left turn, merging with traffic, entering oncoming traffic, maneuvering around a double-parked car, passing a slow car on its left, and so on).

Figure 6:
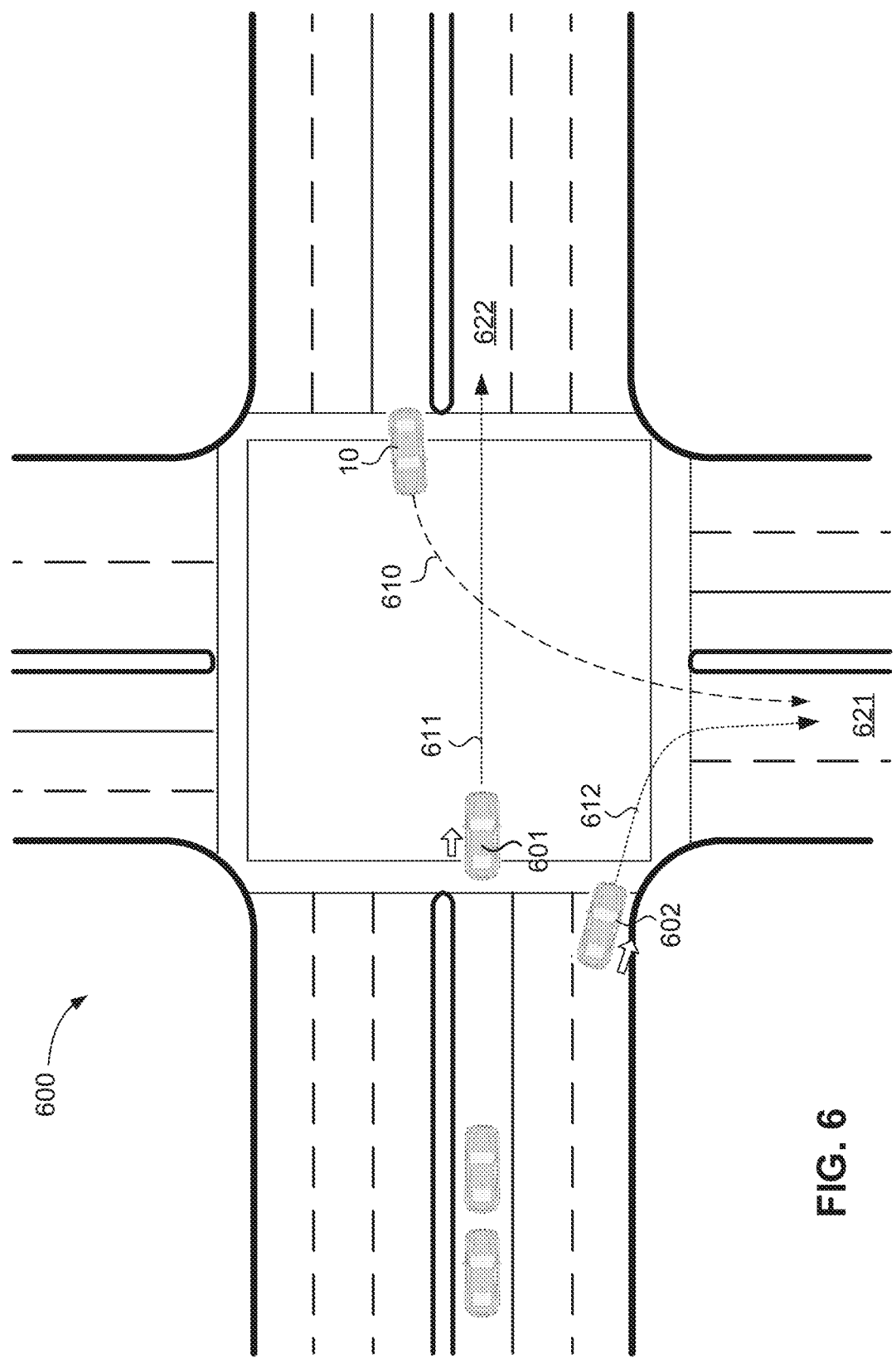
FIG. 6 is a top-down view of an intersection useful in understanding systems and methods in accordance with various embodiments.
Figure 7:
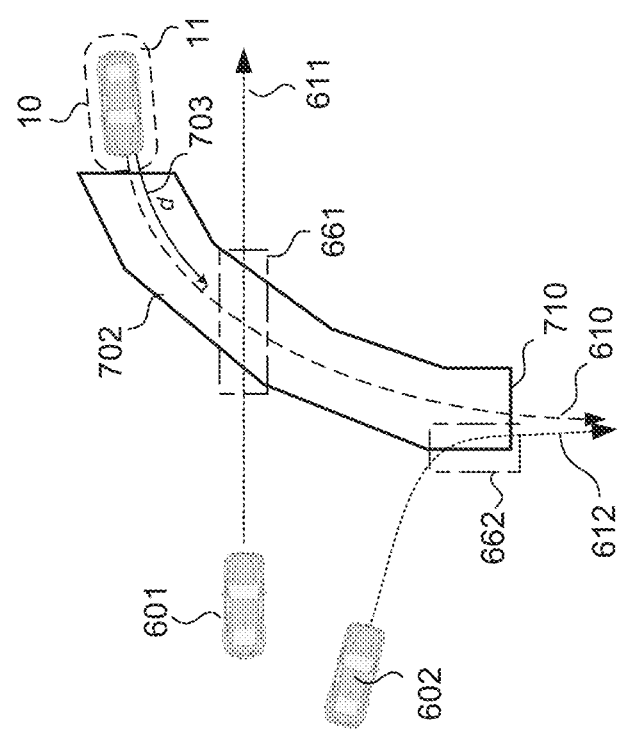
FIG. 7 illustrates a region of interest corresponding to the intersection illustrated in FIG. 6, in accordance with various embodiments.

FIG. 6 depicts an example scenario helpful in understanding the present subject matter. As shown, AV 10 has an intended path 610 corresponding to an unprotected left turn into a lane 621 at an intersection 600. Also shown in FIG. 6 are a number of vehicles (or "obstacles") that might be relevant in deciding whether and/or how AV 10 should complete its turn, as well as its target and acceleration and velocity during that turn. For example, AV 10 may observe an oncoming vehicle 601 whose trajectory indicates that it intends to cross intersection 600 and continue on in lane 622, and another vehicle 602 whose trajectory indicates that it intends to make a right turn into the same lane 621 being targeted by AV 10. The region of interest in this scenario is the area (or lane) that AV 10 will likely traverse in following path 610. In that regard, FIG. 7 depicts a simplified version of FIG. 6 that isolates certain features of the illustrated scenario, namely, a region of interest 702 corresponding to intended path 703 of AV 10 as it takes a left turn, as well as paths 611 and 612 of vehicles 601 and 602, respectively. In certain embodiments, the region of interest 702 of FIG. 7 is determined in accordance with step 502 of the process 500 as discussed above in connection with FIG. 2 (for example, by the guidance system 78 of FIG. 3 in conjunction with the module 430 of FIG. 4). In certain embodiments, the region of interest 702 of FIG. 7 is determined based on an expected path of travel for the vehicle 10 in making a left turn, including a width of the AV 10 along the path and a buffer region surrounding the width of the AV 10. As mentioned above, while region of interest 702 in FIG. 7 is illustrated as a polygon, the present embodiments are not limited to such representations.

Figure 8:
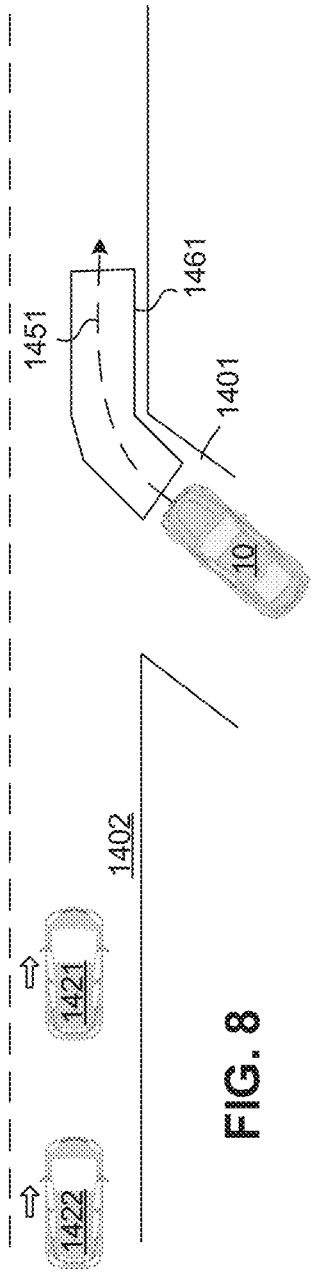
FIGS. 8 and 9 present additional scenarios and regions of interests, in accordance with various embodiments.
Figure 9:
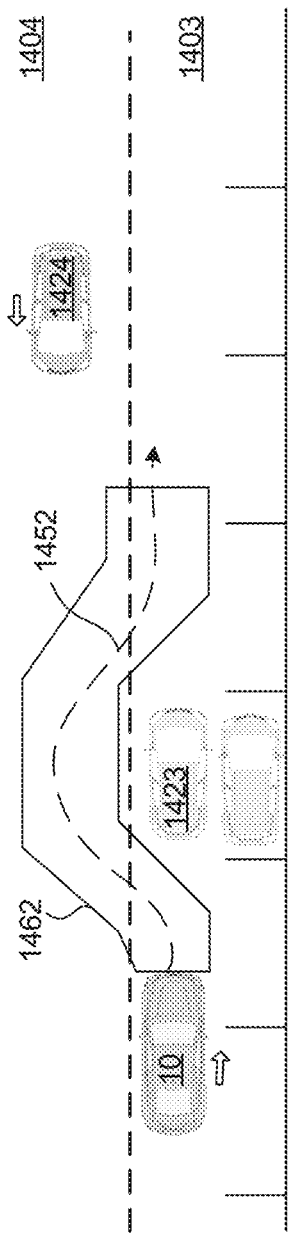

Furthermore, it will be appreciated that the present systems and methods are not limited to unprotected left turn scenarios as depicted in FIG. 6, and may be employed in any context in which AV 10 has an intended path within a region of interest that requires consideration of moving objects (e.g., other vehicles) in the vicinity. Referring momentarily to FIG. 8, for example, systems in accordance with various embodiments may be used in cases in which AV 10 has an intended path 1451 through a region of interest 1461 when attempting to enter lane 1402 from a lane 1401, taking into account oncoming vehicles 1421 and 1422. FIG. 9 shows another example, in which AV 10 has an intended path 1452 that takes it through a region of interest 1462 around a double-parked vehicle 1423, taking into account oncoming vehicle 1424. As shown, path 1452 takes AV 10 from lane 1403, to lane 1404, and back to lane 1403.

Referring again to FIG. 5, in various embodiments a current state of the AV 10 and/or the region of interest is determined at 504. In various embodiments, the current state of the AV 10 includes a time value (e.g., a future point in time relative to a current point in time) along with an expected relative position, velocity, and acceleration of the AV 10 with respect to the region of interest of 502, and along with predicted locations of other vehicles and other objects in proximity thereto. Also in various embodiments, the current state of the AV 10 is determined via the AV state determination module 450 of FIG. 4, for example based on sensor data from the sensor system 28 of FIG. 1.

Also in various embodiments, at 506 the predicted paths of objects (or "obstacles") likely to intersect the region of interest (and tracked by AV 10 using sensor system 28) are determined (e.g., via the object path determination module 440 of FIG. 4) within some predetermined time interval or "planning horizon". In various embodiments, these determinations may take into account, for example the position, speed, acceleration, pose, size, and any other relevant attribute of nearby objects, as well as the position, size, and geometry of the region of interest and the planning horizon.

In various embodiments, a vehicle perception system (e.g., that may include the computer vision system 74 of FIG. 3, as well as systems that utilize radar, lidar, and/or other data) may be employed to determine which objects, if any, are likely to intersect with the region of interest within the planning horizon. In this regard, the planning horizon time interval may vary depending upon a number of factors, but in one embodiment is between approximately 10-20 seconds, such as 15 seconds. The range of possible embodiments is not so limited, however. Referring again to the example depicted in FIG. 7, it can be seen that paths 611 and 612 intersect (at 661 and 662, respectively) the region of interest 702.

Also in various embodiments, a lattice of future states is defined at 506. In various embodiments, the graph definition and analysis module 460 of FIG. 4 (e.g., using one or more processors, such as the processor 44 of FIG. 4) defines a lattice of future states for the AV 10 and/or the region of interest at various future points in time relative to a current time. In various embodiments, the lattice comprises nodes of the lattice solver graph 1500 depicted in FIG. 10 and described further below in connection therewith. For example, in various embodiments, each node of the lattice represents a time value along with parameter values for a corresponding state of the AV 10 and/or region of interest at such point in time of the future that is associated with the time value. In various embodiments, similar to the discussion above, the parameter values include, for each particular point in time, an expected relative position and velocity of the AV 10 with respect to the region of interest, along with predicted locations of other vehicles and other objects in proximity thereto. Also in certain embodiments, the acceleration of the AV 10 is featured as a transition between the states. In certain embodiments, the directed graph is computed all at once by a particular component of the system. In various other embodiments, the directed graph may be constructed in one or more different manners. For example, in certain embodiments, the directed graph may be constructed "lazily", or "as-needed" by the graph search algorithm (Dijkstra or A*), according to a specification of how states may evolve.

In addition, in various embodiments, a directed graph is generated at 508 that corresponds to the defined lattice of 506. In various embodiments, the directed graph connects various nodes of the lattice defined in 506, based on the parameters described above and/or the acceleration of the AV 10. Also in various embodiments, the lattice solver graph comprises a plurality of connected nodes, with the first node representing a current time and a current state, and each subsequent node being dependent upon on one or more prior nodes. Also in various embodiments, the directed graph includes various associated costs for the various nodes and/or transitions therebetween based on a cost function that is applied for the respective states of the AV 10 and/or the transitions therebetween (e.g., the AV 10 acceleration) relative to the region of interest for each of the various nodes and/or transitions. In certain embodiments, the cost function is applied only to the nodes themselves. In other embodiments, the cost function is applied to the state nodes as well as to the transitions (e.g., including the AV 10 acceleration) between the state nodes. For example, in certain embodiments, the AV 10 might contact other vehicles and/or other objects at times between two discrete timesteps. For example, a fast-moving vehicle may be predicted to cross the AV's path at t=0.25, but be well ahead of the AV at t=0.0 and well past the AV at t=0.5, and so on. Accordingly, in various embodiments, the cost function is applied to the state nodes as well as the transitions therebetween. In various embodiments, the graph definition and analysis module 460 of FIG. 4 (e.g., using one or more processors, such as the processor 44 of FIG. 4) generates the directed graph for the AV 10.

With reference to FIG. 10, an exemplary lattice solver graph 1500 (including the lattice of future states of 506 and the directed graph connecting the various states of the lattice of 508) is depicted, in accordance with exemplary embodiments. In various embodiments, the lattice solver graph 1500 utilizes a heuristic approach to path planning and constraint processing. In addition, in various embodiments, the lattice solver graph 1500 is generated dynamically "on-the-fly" as the AV 10 is operated. In certain embodiments, the lattice solver graph 1500 could be pre-generated within the constraints of the planning problem (e.g., with a possible discretized travel and time limits that define the "planning horizon"). However, in various embodiments, such a pre-computation may not be necessary for solving the problem correctly and quickly via the lattice solver graph 1500. As depicted in FIG. 10, the lattice solver graph 1500 includes a first node 1501 representing an initial state of the AV 10, along with various subsequent nodes 1511-1548 for various future states of the AV 10 at various different future points in time under various different scenarios, in accordance with various embodiments. Also in various embodiments, the lattice solver graph 1500 corresponds to the lattice and directed graph as described above.

Also in various embodiments, each of the subsequent nodes 1511-1548 has a cost associated therewith, as determined via application of a cost function with respective states associated with the various nodes and with respect to transitions between the nodes. For example, in various embodiments, an assigned cost associated with each node (and/or transition between nodes) may be an integer, a real number, or any other quantitative measure that would allow different nodes and corresponding paths to be compared. In various embodiments, the cost function produces a cost number for each specific node (and/or transition between nodes) that is based on the cost function as applied to various factors of the particular node that pertain to the state of the AV 10 with respect to the region of interest. Also in various embodiments, the cost function is also applied to transitions between the various nodes, and is based at least in part on occupant comfort, energy and a distance between the AV 10 and one or more objects, among other possible factors. For example, in various embodiments, such factors may include, without limitation: whether another vehicle or other object is likely to contact the AV 10 (with a relatively high cost in the event of contact), whether or not another vehicle or other object is likely to intersect with a path of the AV 10 such as to require an evasive maneuver (with a relatively high cost associated with such a maneuver, but potentially less than the cost of contact itself), whether or not another vehicle or other object is likely to come sufficiently close to contacting the AV 10 such as to potentially make a passenger of the AV 10 uncomfortable (also with a relatively high cost associated with such a maneuver, but potentially less than the cost of contact itself), the type of object that the AV 10 contact or nearly contact (e.g., with a relatively higher cost for near contact with a pedestrian or bicyclist as compared with other vehicles or other objects), one or more other measures of occupant comfort (e.g., relatively higher costs associated with higher levels of acceleration, velocity, and/or jerk), energy usage (e.g., relatively higher costs with higher energy usage, all else being equal), whether and to what extent the end of the region of interest has been reached (e.g., with relatively higher costs for a longer duration to reach the end of the region of interest, all else being equal), and the like. In certain embodiments, the respective costs of the various nodes are determined as part of the generation of the directed graph during step 508 described above in connection with the process 500 of FIG. 5 during operation of the AV 10, based on the cost function. Also in certain embodiments, the cost function is predetermined (e.g., during manufacturing and/or programming of the AV 10) and pre-stored in memory of the AV 10 (e.g., the computer readable storage device or media 46 of FIG. 1). In certain embodiments, the respective costs may change using the same cost function as conditions change for or surrounding the AV 10 (e.g., as the AV 10 is operated and/or as the AV 10 encounters changes in roadways, traffic, velocity, acceleration, direction, weather, obstacles, and so on). Also in certain embodiments, the cost function may be updated from time to time (e.g., during servicing of the AV 10) and may be re-stored in the memory of the AV 10.

In various embodiments, the first node 1501 includes an initial state that comprises an initial position with respect to the region of interest, and velocity of the AV 10 with respect to the region of interest. In various embodiments, the first node 1501 is associated with a beginning or origin time for the method 500, referred to as Time Zero (or $t_0$). From the first node 1501, the lattice solver graph 1500 initially proceeds in one of three directions 1571, 1572, or 1573 based on an acceleration of the AV 10.

If the AV 10 is decelerating (i.e., if the acceleration of AV 10 is less than zero at time zero), then the lattice solver graph 1500 proceeds in a first direction 1571, to reach node 1511. Specifically, in various embodiments, node 1511 refers to a state of the AV 10 at a first subsequent point in time during the method 500, referred to as Time One. In various embodiments, Time One ($t_1$) corresponds to a point in time that is immediately subsequent to Time Zero, i.e., after a time step. In certain embodiments, the time step may be equal to approximately 0.5 seconds; however, this may vary in other embodiments.

Accordingly, in various embodiments, node 1511 includes the state of the AV 10. In various embodiments, the state of the AV 10 represented at node 1511 includes a relative position and velocity of the AV 10 with respect to the region of interest, and including information as to any other detected vehicles or other objects, including a proximity of the AV 10 with respect to the other vehicles or other objects, and related parameters (e.g., whether another vehicle or other object is likely to contact the AV 10, whether or not another vehicle or other object is likely to intersect with a path of the AV 10 such as to require an evasive maneuver, whether or not another vehicle or other object is likely to come sufficiently close to contacting the AV 10, energy usage, proximity to the end of the region of interest, and the like). In addition, in various embodiments, node 1511 includes a cost, based on an application of the cost function to the AV 10 state represented at node 1511. In certain embodiments, the cost associated with node 1511 may be relatively low, for example with relatively smooth deceleration, and provided that there is sufficient distance between the AV 10 and any other vehicles or other objects. Also in various embodiments, a transition between node 1511 and one or more other nodes may comprise an acceleration of the AV 10 as well as an associated cost for the transition.

With reference again to the first node 1501, if the AV 10 is neither accelerating nor decelerating (or, in certain embodiments, if the acceleration or deceleration is minimal, or less than a predetermined threshold), then the lattice solver graph 1500 proceeds in a second direction 1572 to reach node 1512. Specifically, in various embodiments, node 1512 refers to another state of the AV 10 at the above-referenced Time One ($t_1$).

Accordingly, in various embodiments, node 1512 includes the state of the AV 10 at Time One ($t_1$) in a different scenario, in which there is no (or minimal) acceleration or deceleration. In various embodiments, the state of the AV represented at node 1512 includes a relative position and velocity of the AV 10 with respect to the region of interest, along with the other related parameters discussed above with respect to node 1511. Also similar to the discussion above, in various embodiments, node 1512 similarly includes a cost, based on an application of the cost function to the AV 10 state represented at node 1512. In certain embodiments, the cost associated with node 1512 may also be relatively low, for example with little or no acceleration, and provided that there is sufficient distance between the AV 10 and any other vehicles or other objects. Also in various embodiments, a transition between node 1512 and one or more other nodes may comprise an acceleration of the AV 10 as well as an associated cost for the transition.

With reference once again to the first node 1501, if the AV 10 is accelerating (or, in certain embodiments, if the acceleration is greater than a predetermined threshold, such as to potentially cause discomfort for a passenger of the AV 10), then the lattice solver graph 1500 proceeds in a third direction 1573 to reach node 1513. Specifically, in various embodiments, node 1513 refers to another state of the AV 10 at the above-referenced Time One ($t_1$).

Accordingly, in various embodiments, node 1513 includes the state of the AV 10 at Time One ($t_1$) in a different scenario, in which there is acceleration (e.g., that is greater than a predetermined threshold). In various embodiments, the state of the AV 10 represented at node 1513 includes a relative position and velocity of the AV 10 with respect to the region of interest, along with the other related parameters discussed above with respect to node 1511. Also similar to the discussion above, in various embodiments, node 1513 similarly includes a cost, based on an application of the cost function to the AV 10 state represented at node 1513. In certain embodiments, the cost associated with node 1513 may be moderate in magnitude (e.g., greater than the costs of 1511 and 1512, due to potential passenger discomfort that may be associated with a relatively large acceleration for the AV 10, but less than other states, for example in which another vehicle or other object may contact the AV 10, and so on). Also in various embodiments, a transition between node 1513 and one or more other nodes may comprise an acceleration of the AV 10 as well as an associated cost for the transition.

Also in various embodiments, for each respective node 1511, 1512, and 1513, the lattice solver graph 1500 reaches the next respective node using one of the three directions 1571, 1572, or 1573 based on the acceleration of the AV 10 at the point in time associated with the respective node 1511, 1512, or 1513. Specifically, one of nodes 1521-1525 are reached at Time Two ($t_2$), for example corresponding to a passage of time equal to the time step from Time One. For example, as discussed above, in certain embodiments the time step may be approximately equal to 0.5 seconds; however, this may vary in other embodiments.

Specifically, in various embodiments, from node 1511, the lattice solver graph 1500 proceeds, for Time Two ($t_2$), to: (i) node 1521, if the AV 10 is decelerating; (ii) node 1522, if the AV 10 is neither accelerating or decelerating (or, e.g., is accelerating less than a predetermined threshold); or (iii) node 1523, if the AV 10 is accelerating (e.g., greater than a predetermined).

Similarly, in various embodiments, from node 1512, the lattice solver graph proceeds, for Time Two ($t_2$), to: (i) node 1522, if the AV 10 is decelerating; (ii) node 1523, if the AV 10 is neither accelerating or decelerating (or, e.g., is accelerating less than a predetermined threshold); or (iii) node 1524, if the AV 10 is accelerating (e.g., greater than a predetermined).

Likewise, in various embodiments, from node 1513, the lattice solver graph proceeds, for Time Two ($t_2$), to: (i) node 1523, if the AV 10 is decelerating; (ii) node 1524, if the AV 10 is neither accelerating or decelerating (or, e.g., is accelerating less than a predetermined threshold); or (iii) node 1525, if the AV 10 is accelerating (e.g., greater than a predetermined).

For each of the nodes 1521-1525 of Time Two ($t_2$), each node includes a different respective state of the AV 10, including a relative position and velocity of the AV 10 with respect to the region of interest, along with the other related parameters discussed above for each node. Also in various embodiments, each of the nodes 1521-1525 similarly include a respective cost, based on an application of the cost function to the AV 10 state represented at the respective node. In certain embodiments, and in certain circumstances: (i) the cost associated with node 1521 may be relatively low (e.g., without acceleration, and with a reasonable distance from objects); (ii) the cost associated with nodes 1522 and 1523 may be significantly high (e.g. representing possible contact with another vehicle or object); and (iii) the costs associated with nodes 1524 and 1525 may be moderate (e.g., with some possible discomfort due to significant acceleration, but less costly than contact with another vehicle, by way of example). Of course, the respective costs of the various nodes may vary in different embodiments, and also in various different scenarios that may be encountered within each of the different embodiments, and so on. Also in various embodiments, each transition between nodes 1521-1525 and one or more other nodes may comprise an acceleration of the AV 10 as well as an associated cost for the transition.

Similarly, for Time Three ($t_3$), the lattice solver graph 1500 proceeds toward one of nodes 1531-1537, depending upon the node occupied at Time Two ($t_2$) and the acceleration or deceleration of the AV 10 at that time.

As illustrated with respect to the nodes 1531-1537 of Time Three ($t_3$), in various embodiments, at any particular point in time, the lattice solver graph 1500 will effectively delete or ignore any nodes for which a corresponding velocity of the AV 10 is less than a first predetermined threshold or greater than a second predetermined threshold. For example, in various embodiments, the lattice solver graph 1500 will effectively delete or ignore any nodes for which a corresponding velocity of the AV 10 is less than zero or greater than a maximum speed limit for the AV 10. In certain embodiments, the maximum speed limit for the AV 10 corresponds to a maximum speed for the AV 10 under any circumstances, regardless of the roadway, for safe and reliable operation of the AV 10. In certain other embodiments, the maximum speed for the AV 10 pertains to a maximum speed limit for a roadway on which the AV 10 is travelling.

For example, with continued reference to the nodes 1531-1537 of Time Three ($t_3$), node 1531 is effectively ignored or deleted from the lattice solver graph 1500 as being part of a first group 1581 of nodes in which the velocity of the AV 10 is less than zero. Also by way of example, node 1537 is effectively ignored or deleted from the lattice solver graph 1500 as being part of a second group 1582 of nodes in which the velocity of the AV 10 is greater than a maximum speed for the AV 10. For example, by effectively ignoring or deleting such nodes, the computational speed and/or efficiency of the latter solver graph 1500 may be increased.

For each of the nodes 1532-1536 of Time Three ($t_3$) that remain under consideration in the lattice solver graph 1500, each node includes a different respective state of the AV 10, including a relative position and velocity of the AV 10 with respect to the region of interest, along with the other related parameters discussed above for each node. Also in various embodiments, each of the nodes 1532-1536 similarly include a respective cost, based on an application of the cost function to the AV 10 state represented at the respective node. In certain embodiments, and in certain circumstances: (i) the costs associated with nodes 1533 and 1534 may be relatively low (e.g., without significant acceleration, and with a reasonable distance from objects); (ii) the costs associated with nodes 1535 and 1536 may be moderate (e.g., with some possible discomfort due to significant acceleration, but less costly than contact with another vehicle, by way of example); and (iii) the cost associated with node 1532 may be moderate to high, for example due to an evasive action that may be required to avoid contact with another vehicle or object. Of course, the respective costs of the various nodes may vary in different embodiments, and also in various different scenarios that may be encountered within each of the different embodiments, and so on. Also in various embodiments, each transition between nodes 1532-1536 and one or more other nodes may comprise an acceleration of the AV 10 as well as an associated cost for the transition.

Similarly, for Time Four ($t_4$), the lattice solver graph 1500 proceeds toward one of nodes 1541-1548, depending upon the node occupied at Time Three ($t_3$) and the acceleration or deceleration of the AV 10 at that time.

Similar to the discussion above, in various embodiments nodes 1541 and 1542 are effectively ignored or deleted from the lattice solver graph 1500 as being part of the first group 1581 of nodes in which the velocity of the AV 10 is less than zero. Also in various embodiments, node 1548 is effectively ignored or deleted from the lattice solver graph 1500 as being part of the second group 1582 of nodes in which the velocity of the AV 10 is greater than a maximum speed for the AV 10.

For each of the nodes 1543-1547 of Time Four ($t_4$) that remain under consideration in the lattice solver graph 1500, each node includes a different respective state of the AV 10, including a relative position and velocity of the AV 10 with respect to the region of interest, along with the other related parameters discussed above for each node. Also in various embodiments, each of the nodes 1543-1547 similarly include a respective cost, based on an application of the cost function to the AV 10 state represented at the respective node. In certain embodiments, and in certain circumstances: (i) the costs associated with nodes 1545 may be relatively low (e.g., without significant acceleration, and with a reasonable distance from objects); (ii) the costs associated with nodes 1546 and 1547 may be moderate (e.g., with some possible discomfort due to significant acceleration, but less costly than contact with another vehicle, by way of example); and (iii) the costs associated with node 1543 and 1544 may be moderate to high, for example due to another vehicle or other object coming sufficiently close to the AV 10 so as to potentially cause discomfort for a passenger of the AV 10. Of course, the respective costs of the various nodes may vary in different embodiments, and also in various different scenarios that may be encountered within each of the different embodiments, and so on. Also in various embodiments, each transition between nodes 1543-1547 and one or more other nodes may comprise an acceleration of the AV 10 as well as an associated cost for the transition.

In various embodiments, additional nodes may similarly be constructed for the lattice solver graph 1500 at any number of future points of time. Also in various embodiments, such nodes may similarly reflect respective states of the AV 10 with respect to the region of interest, with associated respective costs using the cost function. In certain embodiments, such additional nodes are generated for additional points in time until either a maximum time threshold is utilized and/or until the respective states would extend beyond the region of interest. Also in various embodiments, each transition between such additional nodes and one or more other nodes may comprise an acceleration of the AV 10 as well as an associated cost for the transition.

Referring again to FIG. 5, having thus constructed a directed graph and assigned costs for the various nodes of the lattice solver graph 1500, a suitable graph search is performed (at 510) to select a best-case (lowest total cost) path for AV 10 to travel. For example, in certain embodiments, a sequence of path segments are selected using the various nodes of the lattice solver graph 1500 that accomplishes the desired goal of AV 10 (e.g., traveling along its intended path and completing its traversal of the region of interest, or reaching the end of the planning horizon) while minimizing the sum of the costs of the selected path segments. In various embodiments, the costs analyzed for each segment include the costs of the nodes themselves as well as the costs associated with the transitions between the nodes. In various embodiments, a variety of methods may be used to perform this search. In one embodiment, a Djikstra graph search algorithm is used. In another embodiment, an A* graph search algorithm is used. Regardless of the particular method used to select an optimal or near-optimal path, in various embodiments, the result is a selected path corresponding to the output 461 of lattice solver module 420 in FIG. 4.

For example, referring again to the exemplary lattice solver graph 1500 of FIG. 10, in certain embodiments the system 100 might determine that the lowest-cost path is described by the ordered set of nodes {1501, 1511, 1521, 1533, 1545}. Intuitively, it can be seen that this is a reasonable choice, for example because the resulting path would help to (i) avoid unwanted contact with other vehicles or objects (e.g., avoiding such high cost nodes as a first priority, based on an associated high weighting within the cost function), while also (ii) avoiding, to the extent possible, evasive maneuvers and close contact with other vehicles or objects (e.g., avoiding such moderate to high cost nodes as a second priority, based on an associated medium weighting within the cost function); and while also (iii) avoiding or reducing, to the extent possible, other potentially uncomfortable states such as increased acceleration (e.g., avoiding such moderate cost nodes, or other moderate cost modes, such as a longer travel time, higher energy usage, or the like, as a third priority, based on an associated moderate weighting within the cost function), in certain embodiments.

With reference back to FIG. 5, in various embodiments, the selected path is implemented by the AV 10 at 514. In various embodiments, the selected path is implemented by the vehicle control system 80 of FIG. 3, for example, via instructions provided via the processor 44 of FIG. 1 that are implanted by the propulsion system 20, steering system 24, and brake system 26 of FIG. 1, in various embodiments. Also in various embodiments, the method 500 may terminate when the AV 10 exits the region of interest.

Similar to the discussion earlier in this Application, in various embodiments the path that is selected and implemented may include a seeding and/or a rough and/or preliminary possible path for travel of the AV 10 based at least in part on potential objects nearby the AV 10 and/or the path, for further refinement by a path planning system of the AV 10 prior to implementation for movement of the AV 10. Accordingly, in various embodiments, the selected path is used to identify which obstacles should be considered "front" or "rear" obstacles (that is, which obstacles the AV 10 should travel in front of or behind), for example by filtering predicted obstacles and making yielding decisions for refinement and implementation as part of a larger computer control system. Also in various embodiments, an initial or seeded path determined via the method 500 may be implemented at 514 by utilizing the initial or seeded path as a starting point, then further refining the path via a path planning system of the AV 10 (such as that discussed above), and ultimately causing the AV 10 to travel along the refined path.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of path planning for a vehicle, the method comprising:
   receiving sensor data relating to an environment associated with the vehicle;
   defining a region of interest for the vehicle surrounding an intended maneuver for the vehicle, based on the sensor data;
   constructing, via a processor, a lattice solver graph comprising a lattice of a plurality of connected nodes and transitions therebetween, each of the plurality of connected nodes comprising a time and a corresponding state of the vehicle, each state including a position and a velocity of the vehicle and nearby objects at a time corresponding to a particular node, and each transition representing an acceleration of the vehicle between respective connected nodes; wherein a first node representing a current time and a current state of the vehicle, wherein each subsequent node is dependent upon on one or more prior nodes;
   generating, via the processor, a directed graph that includes a respective associated cost with each of the connected nodes and with transitions therebetween of the lattice solver graph, based on a cost function as applied to the state of the vehicle, at one of a plurality of points in time corresponding to a respective node; and
   performing, via the processor, a search of the directed graph, based on the associated costs of each node of the lattice solver graph, to determine a selected path for the vehicle through the region of interest that minimizes a total cost via the directed graph and the lattice solver graph.

2. The method of claim 1, further comprising:
   determining a set of predicted object paths of one or more objects likely to intersect the region of interest;
   wherein the step of constructing the lattice solver graph comprises defining the graph using the set of predicted object paths of the one or more objects likely to intersect the region of interest; and
   wherein the cost function is based on each of occupant comfort, energy usage, and a distance between the vehicle and the one or more objects.

3. The method of claim 1, wherein the step of constructing the lattice solver graph comprises defining the lattice solver graph using an acceleration of the vehicle at different future points in time, utilizing a time step, such that different nodes are connected based on the acceleration of the vehicle at the different future points of time following various iterations of the time step.

4. The method of claim 3, wherein the step of constructing the lattice solver graph comprises defining the lattice solver graph to include, for each node, a corresponding state comprising the acceleration of the vehicle and a position and velocity of the vehicle at a particular one of the future points in time, along with the associated cost for the corresponding state.

5. The method of claim 4, further comprising:
   ignoring or deleting, from the lattice solver graph, any nodes for which the velocity of the vehicle is less than a predetermined minimum threshold speed or is greater than a predetermined maximum threshold speed.

6. The method of claim 4, wherein the step of constructing the lattice solver graph comprises defining the lattice solver graph to include, for each node, the corresponding state comprising a proximity to one or more objects in the region of interest, in addition to the position, velocity, and acceleration of the vehicle at the particular one of the future points in time, along with the associated cost for the corresponding state.

7. The method of claim 4, wherein the vehicle is an autonomous vehicle, and the method further comprises:
   automatically implementing the selected path, via instructions provided by the processor, for the autonomous vehicle to travel through the region of interest.

8. A system for path planning for a vehicle, the system comprising:
   a region of interest determination module configured to at least facilitate:
      receiving sensor data relating to an environment associated with the vehicle; and
      defining a region of interest for the vehicle surrounding an intended maneuver for the vehicle, based on the sensor data; and
   a graph construction and analysis module coupled to the region of interest determination module and configured to at least facilitate:
      constructing, via a processor, a lattice solver graph comprising a lattice of a plurality of connected nodes and transitions therebetween, each of the plurality of connected nodes comprising a time and a corresponding state of the vehicle each state including a position and a velocity of the vehicle and nearby objects at a time corresponding to a particular node, and each transition representing an acceleration of the vehicle between respective connected nodes; wherein a first node representing a current time and a current state of the vehicle, wherein each subsequent node is dependent upon on one or more prior nodes;

generating, via the processor, a directed graph that includes a respective associated cost with each of the connected nodes and with transitions therebetween of the lattice solver graph, based on a cost function as applied to the state of the vehicle, at one of a plurality of points in time corresponding to a respective node; and performing, via the processor, a search of the directed graph, based on the associated costs of each node of the lattice solver graph, to determine a selected path for the vehicle through the region of interest that minimizes a total cost via the directed graph and the lattice solver graph.

9. The system of claim 8, further comprising:

an object path determination module configured to at least facilitate determining a set of predicted object paths of one or more objects likely to intersect the region of interest;

wherein the graph construction and analysis module is configured to at least facilitate constructing the lattice solver graph using the set of predicted object paths of the one or more objects likely to intersect the region of interest.

10. The system of claim 8, wherein the graph construction and analysis module is configured to at least facilitate constructing the lattice solver graph using an acceleration of the vehicle at different future points in time, utilizing a time step, such that different nodes are connected based on the acceleration of the vehicle at the different future points of time following various iterations of the time step.

11. The system of claim 10, wherein the graph construction and analysis module is configured to at least facilitate constructing the lattice solver graph to include, for each node, a corresponding state comprising the acceleration of the vehicle in addition to a position and velocity of the vehicle at a particular one of the future points in time, along with the associated cost for the corresponding state.

12. The system of claim 11, wherein the graph construction and analysis module is configured to at least facilitate ignoring or deleting, from the lattice solver graph, any nodes for which the velocity of the vehicle is less than a predetermined minimum threshold speed or is greater than a predetermined maximum threshold speed.

13. The system of claim 11, wherein the graph construction and analysis module is configured to at least facilitate constructing the lattice solver graph to include, for each node, the corresponding state comprising a proximity to one or more objects in the region of interest, in addition to the position, velocity, and acceleration of the vehicle at the particular one of the future points in time, along with the associated cost for the corresponding state.

14. The system of claim 11, wherein the vehicle is an autonomous vehicle, and the graph construction and analysis module is configured to at least facilitate automatically implementing the selected path, via instructions provided by the processor, for the autonomous vehicle to travel through the region of interest.

15. An autonomous vehicle, comprising:

at least one sensor that provides sensor data; and a controller that is configured, by a processor, based on the sensor data, to:

define a region of interest for the autonomous vehicle surrounding an intended maneuver for the autonomous vehicle;

construct a lattice solver graph comprising a lattice of a plurality of connected nodes and transitions therebetween, each of the plurality of connected nodes comprising a time and a corresponding state of the autonomous vehicle, each state including a position and a velocity of the autonomous vehicle and nearby objects at a time corresponding to a particular node, and each transition representing an acceleration of the vehicle between respective connected nodes; wherein a first node representing a current time and a current state of the autonomous vehicle, wherein each subsequent node is dependent upon on one or more prior nodes;

generate a directed graph that includes a respective associated cost with each of the connected nodes and with transitions therebetween of the lattice solver graph, based on a cost function as applied to the state of the autonomous vehicle, at one of a plurality of points in time corresponding to a respective node;

perform a search of the directed graph, based on the associated costs of each node of the lattice solver graph, to determine a selected path for the autonomous vehicle through the region of interest that minimizes a total cost via the directed graph and the lattice solver graph; and automatically implement the selected path for the autonomous vehicle to travel through the region of interest.

16. The autonomous vehicle of claim 15, wherein the controller is configured to:

determine a set of predicted object paths of one or more objects likely to intersect the region of interest; and construct the lattice solver graph using the set of predicted object paths of the one or more objects likely to intersect the region of interest.

17. The autonomous vehicle of claim 15, wherein the controller is configured to construct the lattice solver graph using an acceleration of the autonomous vehicle at different future points in time, utilizing a time step, such that different nodes are connected based on the acceleration of the autonomous vehicle at the different future points of time following various iterations of the time step.

18. The autonomous vehicle of claim 17, wherein the controller is configured to construct the lattice solver graph to include, for each node, a corresponding state comprising the acceleration of the autonomous vehicle in addition to a position and velocity of the autonomous vehicle at a particular one of the future points in time, along with the associated cost for the corresponding state.

19. The autonomous vehicle of claim 18, wherein the controller is configured to ignore or delete, from the lattice solver graph, any nodes for which the velocity of the autonomous vehicle is less than a predetermined minimum threshold speed or is greater than a predetermined maximum threshold speed.

20. The autonomous vehicle of claim 18, wherein the controller is configured to construct the lattice solver graph to include, for each node, the corresponding state comprising a proximity to one or more objects in the region of interest, in addition to the position, velocity, and acceleration of the autonomous vehicle at the particular one of the future points in time, along with the associated cost for the corresponding state.

* * * * *